United States Patent
Gambhir et al.

(10) Patent No.: US 9,602,186 B1
(45) Date of Patent: Mar. 21, 2017

(54) EXTENDING MOBILE NETWORK PRESENCE

(71) Applicant: International Business Machines Corporation, Armonk, NY (US)

(72) Inventors: Kapil Gambhir, New Delhi (IN); Jaspreet Singh, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/848,406

(22) Filed: Sep. 9, 2015

(51) Int. Cl.
*H04W 36/00* (2009.01)
*H04B 7/155* (2006.01)
*H04W 76/02* (2009.01)
*H04W 76/04* (2009.01)
*H04W 88/04* (2009.01)

(52) U.S. Cl.
CPC .... *H04B 7/15507* (2013.01); *H04W 36/0055* (2013.01); *H04W 76/023* (2013.01); *H04W 76/045* (2013.01); *H04W 88/04* (2013.01)

(58) Field of Classification Search
CPC . H04W 36/00; H04W 36/0055; H04W 36/16; H04W 36/30; H04W 36/36; H04W 36/38; H04W 76/025; H04W 76/027; H04W 76/045; H04W 84/18; H04W 84/20; H04W 88/00; H04W 88/022; H04W 88/04
USPC .................................. 455/436, 437, 438, 445
See application file for complete search history.

(56) References Cited

U.S. PATENT DOCUMENTS

| 8,036,600 | B2 | 10/2011 | Garrett et al. | |
| 2008/0102843 | A1* | 5/2008 | Todd | H04W 36/18 455/445 |
| 2010/0182916 | A1* | 7/2010 | Drewes | H04B 7/15521 370/252 |
| 2010/0303008 | A1 | 12/2010 | Wietfeldt et al. | |
| 2015/0245184 | A1* | 8/2015 | Govande | H04M 3/543 455/417 |

FOREIGN PATENT DOCUMENTS

CN   103179635 A   6/2013

OTHER PUBLICATIONS

IBM, "Tunnelling Mobile Phone Traffic Through a Secondary Device using Bluetooth", IP.com No. 000183819, Jun. 2, 2009, pp. 1-3.

(Continued)

*Primary Examiner* — Temica M Beamer
(74) *Attorney, Agent, or Firm* — Reza Sarbakhsh (57) ABSTRACT

Embodiments of the present invention may relate to extending a network's presence. A first device may compile an accepted device list including a second device. The first device may determine a network connection status, such as, for example, connected, weak connection, and disconnected. In response to determining the network connection status is disconnected, the first device may search for the second device. In response to determining the network connection status is connected, the first device may discontinue searching for the second device. In response to determining the network connection status is weak connection, the first device may search for the second device. The first device may evaluate connectivity information of the second device. The first device may communicate with at least one network via the second device.

11 Claims, 5 Drawing Sheets

(56) References Cited

OTHER PUBLICATIONS

Disclosed Anonymously, "Smart Crowd-Delegated Data Transfer for Mobile Devices", IP.com No. 000213429, Dec. 14, 2011, pp. 1-3.
http://stackoverflow.com/questions/15657784/call-transfer-from-one.device-to-another-through-bluetooth.com, "Call Transfer From One Device to Another Through Bluetooth", printed on Aug. 20, 2015, page 1.

* cited by examiner

FIG. 5

EXTENDING MOBILE NETWORK PRESENCE

BACKGROUND

The present invention relates generally to the field of computing, and more particularly to extending mobile network presence.

When a mobile device travels out of a network coverage area, a loss of connectivity may cause distress for a caller or a callee. For example, a caller may be unable to communicate important information to a callee. Under normal circumstances, an inability to communicate may be frustrating. In an emergency, an inability to communicate may have devastating results. Thus, a method for efficiently extending mobile network presence and maintaining call continuity is needed.

SUMMARY

Embodiments of the present invention disclose a method for extending a network's presence. A first device may compile an accepted device list including a second device. The first device may determine a network connection status, such as, for example, connected, weak connection, and disconnected. In response to determining the network connection status is disconnected, the first device may search for the second device. In response to determining the network connection status is connected, the first device may discontinue searching for the second device. In response to determining the network connection status is weak connection, the first device may search for the second device.

Embodiments of the present invention disclose a computer program product for extending a network's presence. The computer program product may comprise a computer readable storage medium having program instructions embodied therewith. The computer readable storage medium is not a transitory signal per se. A first device may compile an accepted device list including a second device. The first device may determine a network connection status, such as, for example, connected, weak connection, and disconnected. In response to determining the network connection status is disconnected, the first device may search for the second device.

Embodiments of the present invention disclose a system for extending a mobile network. The system may comprise one or more computer processors, one or more computer-readable storage media, and program instructions stored on the computer-readable storage media for execution by at least one of the one or more processors. The program instructions may include program instructions to compile an accepted device list, wherein the accepted device list includes a second device. The program instructions may include program instructions to determine a network connection status, wherein the network connection status includes connected and disconnected. In response to determining the network connection status is disconnected, the program instructions may direct the first device to search for the second device.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Embodiments of the present invention may relate to extending a mobile network's presence. Leaving a network coverage area may cause a mobile device to have a weak connection or disconnect with a network. When the mobile device travels out of a network coverage area, another network coverage area may be present and/or a second device may be within a proximity of the mobile device. The mobile device may be within proximity of one or more second devices which may be connected to one or more networks. Thus, although the mobile device may not be able to connect to a network, one or more second devices within a proximity of the mobile device may be able to connect to a network.

A user of a mobile device may have security concerns regarding utilizing a second device to connect to a network. A second device may have a hostile user or attempt to acquire private information regarding the user of the mobile device. Thus, selecting second devices which may be trusted by a user of the mobile device is necessary to protect security.

Embodiments of the present invention may exploit a network connection of one or more second devices within a proximity of a first device. Exploiting the network connection of one or more second devices may expand a mobile network area for a first device. In addition, embodiments of the present invention may generate an accepted device list to limit connectivity to one or more trusted second devices. Embodiments of the present invention will now be described in detail with reference to FIGS. 1-5.

Figure 1:
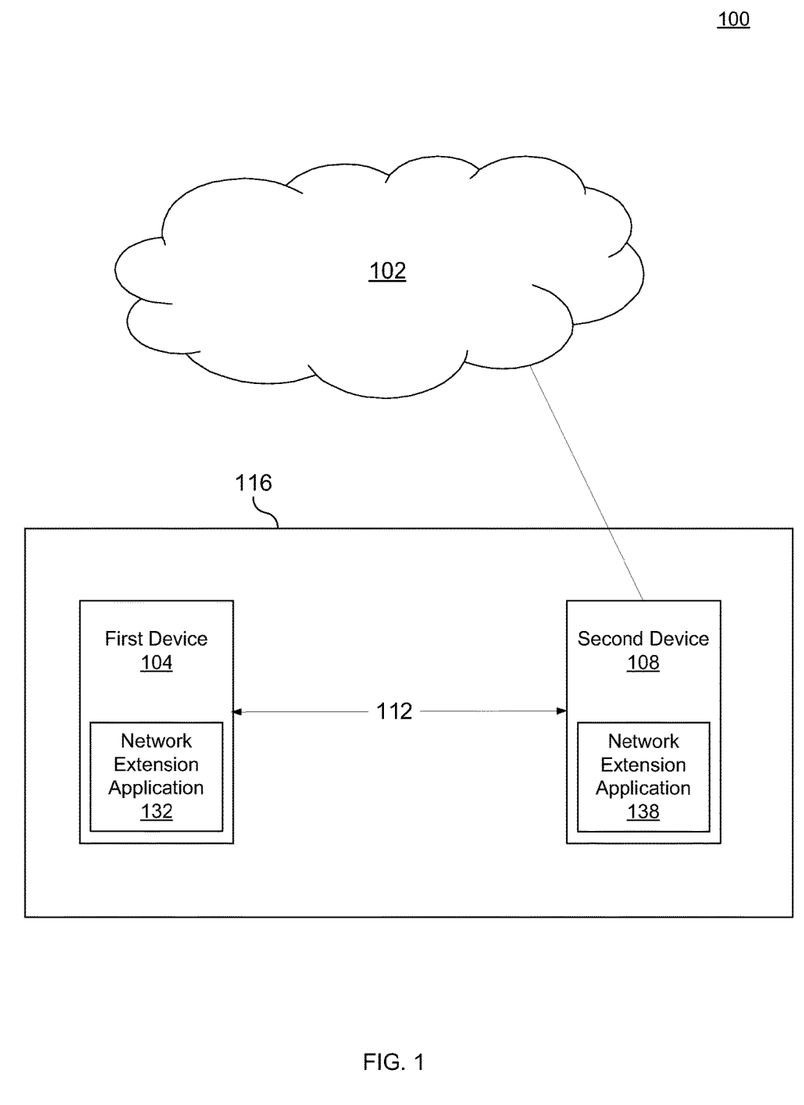
FIG. 1 is a functional block diagram illustrating extending mobile network presence, in accordance with an embodiment of the present invention.

FIG. 1 is a network extension system 100, according to an aspect of the invention. In an exemplary embodiment, the network extension system 100 may include a network 102, a first device 104, a second device 108, a communication method 112, and an extension environment 116.

Network 102 may be any combination of connections and protocols that will support communications between a server and the second device 108. In an embodiment, network 102 may be the Internet, representing a worldwide collection of networks and gateways to support communications between devices connected to the Internet. Network 102 may include, for example, wired, wireless or fiber optic connections. In other embodiments, network 102 may be implemented as an intranet, a local area network (LAN), a wide area network (WAN), or a combination thereof. Network 102 may include wired connections, wireless connections, fiber optic connections, or a combination thereof. In a preferred embodiment, the network 102 may be a mobile network. A mobile network may be any network capable of communicating with a mobile device.

The second device 108 may be a laptop computer, tablet computer, netbook computer, personal computer (PC), desktop computer, mobile phone, or any programmable electronic device. In an embodiment, the second device 108 may be a second mobile device, a third mobile device, or a combination thereof. The second device 108 may include internal and external hardware components, as depicted and described in further detail with respect to FIG. 5. The second device 108 may include any communication device known in the art, such as, for example, a Bluetooth device, WiFi device, near-field communication (NFC) device, radio frequency device, or any combination thereof. The second device 108 may include the network extension application 138.

The network extension application 138 may function in conjunction with the network extension application 132 in the first device. The network extension application 138 may act as an intermediary by providing a connection between the first device 104 and the network 102. For example, the network extension application 132 may request data from the network extension application 138 and the network extension application 138 may request data from the network 102. In another example, the network extension application 132 may transmit data to the network extension application 138 and the network extension application 138 may transmit data to the network 102. The network extension application 138 may be a program, function, or module of a computer program (not shown) executable by a processor of the network extension system 100, or may be embodied as one or more connected computing systems. Network extension application 138 may be stored on the computer-readable storage media for execution by one or more processors.

The first device 104 may be a laptop computer, tablet computer, netbook computer, personal computer (PC), desktop computer, mobile phone, or any programmable electronic device. In an embodiment, the first device 104 may be a first mobile device. The first device 104 may include internal and external hardware components, as depicted and described in further detail with respect to FIG. 5. The first device 104 may include any communication device known in the art, such as, for example, a Bluetooth device, WiFi device, near-field communication (NFC) device, radio frequency device, or any combination thereof. The first device 104 may include a network extension application 132.

The network extension application 132 may be a program, function, or module of a computer program (not shown) executable by a processor of the network extension system 100, or may be embodied as one or more connected computing systems. Network extension application 132 may be stored on the computer-readable storage media for execution by one or more processors. The network extension application 132 may establish a connection with the network extension application 138 in order to establish a connection with the network 102. For example, the network extension application 132 may request data from the network extension application 138. In another example, the network extension application 132 may transmit data to the network extension application 138. Network extension application 132 may be program instructions to complete the steps indicated in method 400, discussed below with reference to FIG. 4. In an embodiment, network extension system 100 may be implemented using a computing node such as the computing node of FIG. 5.

Communication method 112 may be any combination of connections and protocols that will support communications between the first device 104 and the second device 108. In other embodiments, communication method 112 may be implemented as, for example, Bluetooth, Near Field Communication (NFC), or a combination thereof. Communication method 112 may include wired connections, wireless connections, or a combination thereof.

Extension environment 116 may be a location where the first device 104 and second device 108 may communicate. The extension environment 116 may be within, partially within, disconnected from, or adjacent to a region serviced by the network 102. In an example, a portion of the extension environment 116 including the second device 108 may be within a region serviced by the network 102.

The first device 104 may use communication method 112 to transmit and receive data with the second device 108. In an embodiment, the first device 104 and the second device 108 may communicate with one another directly. The second device 108 may communicate with the network 102. The first device 104 may communicate with the network 102 via the second device 108. For example, the first device 104 may transmit data to the second device 108 which is then transmitted by the second device 108 to the network 102. In another example, the network 102 may transmit data to the second device 108 which is then transmitted by the second device 108 to the first device 104.

In an embodiment, the first device 104 may have access to a primary network and parallel access to the network 102 through the second device 108, which may be used to make a parallel dormant communication in addition to an active communication. For example, an active call may be maintained through a primary network while establishing a parallel call through the network 102. Establishing a connection between the first device 104 and the network 102 may maintain call continuity if, for example, the first device 104 becomes disconnected from the primary network. By actively seeking a parallel connection, the first device 104 may preempt a communication loss.

In an embodiment, the primary network for the first device 104 and the network 102 may be the same network. For example, the first device 104 may be traveling toward an outer boundary of a coverage area for the network 102 but be within range to communicate with the second device 108. In such a case, the first device 104 may be connected to the network 102 directly and connect to the network 102 through the second device 108. By connecting to the network 102 through the second device 108, the range and/or quality of the network 102 may be increased. In addition, by preemptively connecting to the network 102 through the second device 108 before a direct connection with the network 102 is disconnected, the first device 104 may preempt a communication loss.

Figure 2:
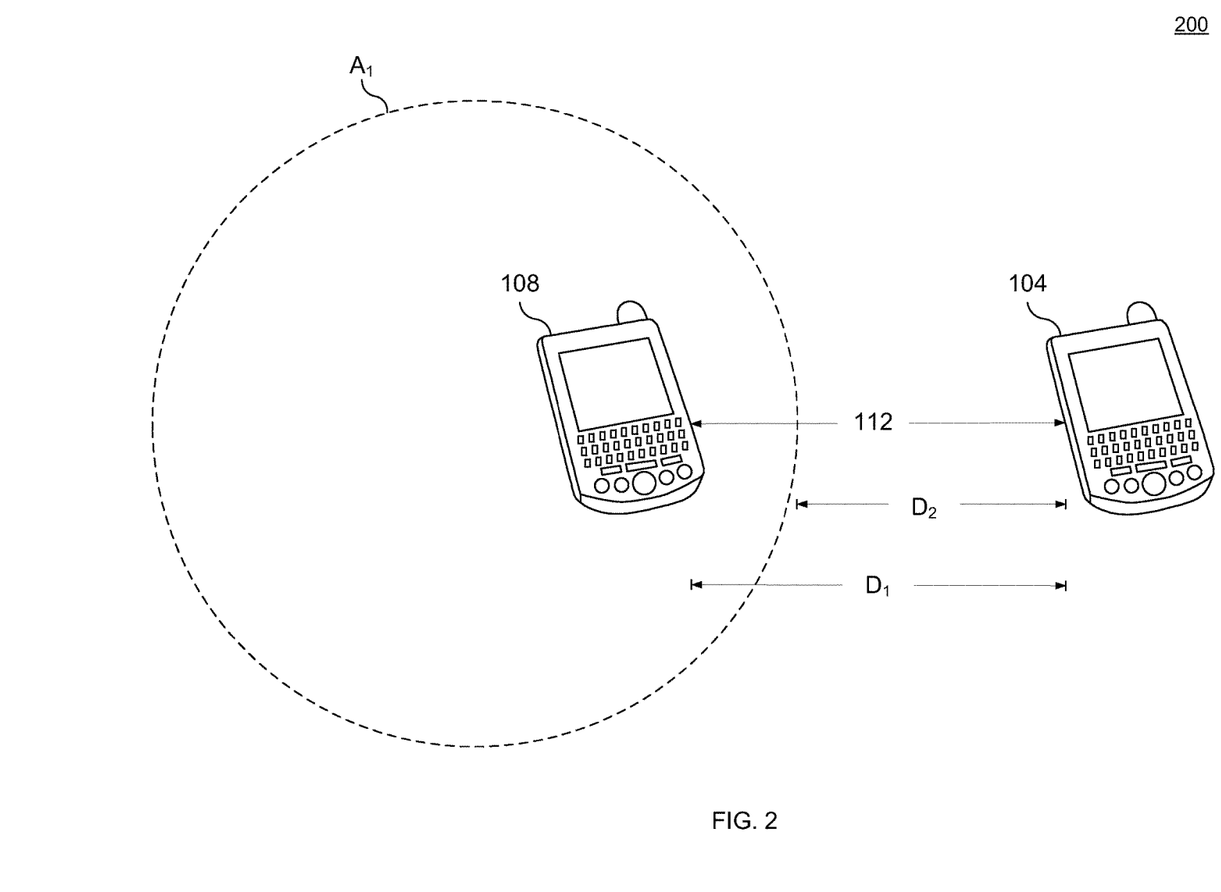
FIG. 2 is a network extension environment, in accordance with an embodiment of the present invention.

FIG. 2 is a network extension environment 200, according to an embodiment of the invention. In an exemplary embodiment, the network extension environment 200 may include the first device 104, the second device 108, the communication method 112, a network service region $A_1$, a first distance $D_1$, and a second distance $D_2$.

The network service region $A_1$ may be a location serviced by one or more networks. In an embodiment, network service region $A_1$ may be serviced by the network 102 (FIG.

1). In an embodiment, a region outside the network service region $A_1$ may be serviced by another network or have no service.

The first distance $D_1$ may be the distance between the first device 104 and the second device 108. In an embodiment, the first distance $D_1$ may be equal to or less than a maximum range of the communication method 112. A maximum range of the communication method 112 may be power-class-dependent. Thus, wide distance ranges may be available and may be increased with additional power.

The second distance $D_2$ may be the distance between the first device and an outer edge of the network service region $A_1$. In an embodiment, the second distance $D_2$ may be the distance by which the network service region $A_1$ may be extended. An outer edge of the network service region $A_1$ may be located at the point at which a network signal is no longer usable. The second distance $D_2$ may be increased by utilizing a long-range communication technology for the communication method 112, increasing power for the communication method 112, moving the second device 108 further out toward the first device 104, or any combination thereof. A long-range communication technology may include, for example, a high frequency radio transmitter.

The first device 104 may be located outside of the network service region $A_1$. The second device may be located within the network service region $A_1$. The first device 104 may be located equal to or less than the distance $D_1$ from the second device 108. The first device 104 may utilize the communication method 112 to communicate with the second device 108. Even though the first device 104 is located outside of the network service region $A_1$, the first device 104 may connect to a network servicing the network service region $A_1$ via the second device 108.

Figure 3:
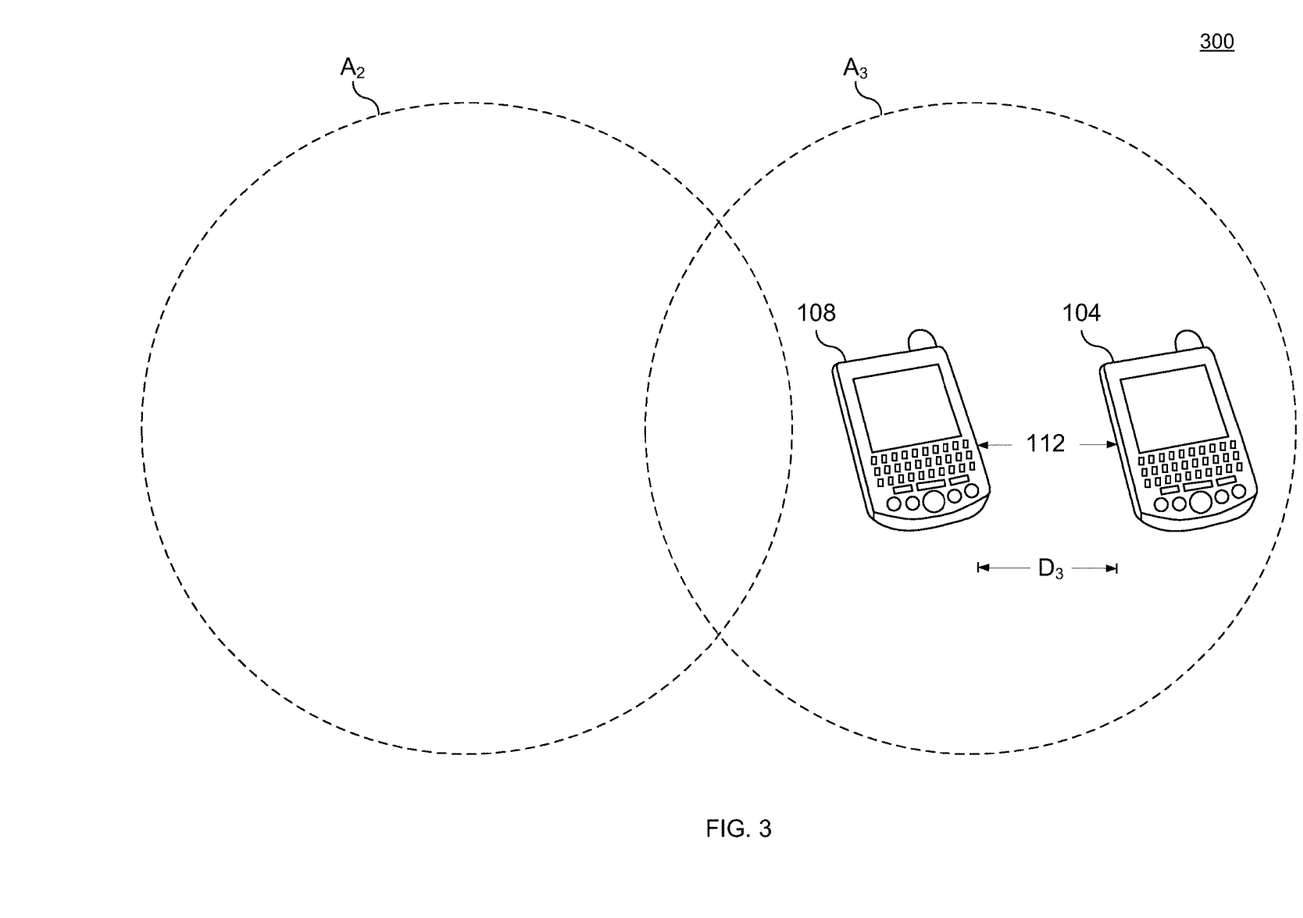
FIG. 3 is a network extension environment, in accordance with an embodiment of the present invention.

FIG. 3 is a network extension environment 300, according to an embodiment of the invention. In an exemplary embodiment, the network extension environment 300 may include the first device 104, the second device 108, the first distance $D_1$, the communication method 112, a network service region $A_2$, and a network service region $A_3$.

The network service region $A_2$ may be a location serviced by one or more networks. In an embodiment, the network service region $A_2$ may be a location serviced by a service provider of the first device 104. The network service region $A_3$ may be a location serviced by one or more networks. In an embodiment, the network service region $A_3$ may be a location serviced by a service provider of the second device 108. The second device 108 may be located within the network service region $A_3$. The first device 104 may be located outside the network service region $A_2$. The first device 104 may be located equal to or less than the first distance $D_3$ from the second device. Although the first device 104 may be located outside of its network region (i.e. the network service region $A_2$), the first device 104 may connect to at least one network via the second device 108 which is located within its network region (i.e. the network service region $A_2$).

Figure 4:
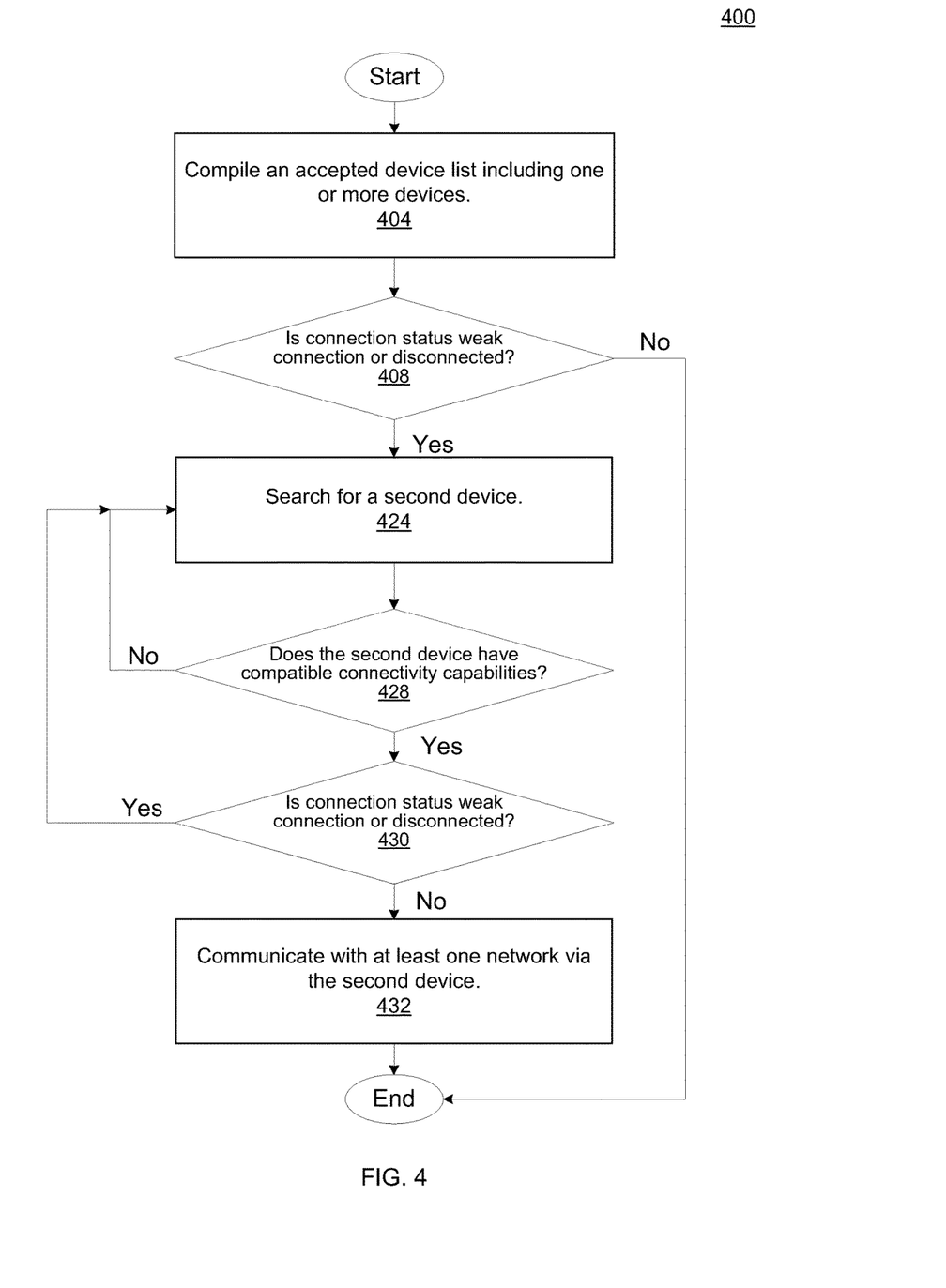
FIG. 4 is a flowchart depicting operational steps of a network extension program, in accordance with an embodiment of the present invention.

FIG. 4 is a flowchart of a method 400 for extending a network presence, using the network extension system 100 of FIG. 1, in accordance with an embodiment of the present invention. Steps of method 400 may be executed using a processor of a computer that encompasses, or is part of, network extension system 100, or another system. In an embodiment, a method of extending a mobile network may involve compiling an accepted device list (step 404), determining whether a network connection status of a first device with a network is weak connection or disconnected (decision 408), searching for a second device (step 424), determining whether a second device has compatible connectivity capabilities (decision 428), determining whether a network connection status of a first device with a network via a second device is weak connection or disconnected (decision 430), and communicating with at least one network via the second device (step 432).

The network extension program 132 (FIG. 1) compiles an accepted device list including one or more devices, e.g. the second device 108 (step 404). For example, the network extension application 132 (FIG. 1) may provide instructions to a computing device located within the first device 104 to compile an accepted device list. In an embodiment, the one or more accepted devices in the accepted device list may be the second device 108 (FIG. 1). In another embodiment, the one or more accepted devices may not be the second device 108. In the event that the second device 108 is not an accepted device, the first device 104 may deny a connection with the second device 108. Step 404 may be performed via a computer algorithm, manual user input, or any combination thereof. The computer algorithm may include instructions regarding, for example, gathering information regarding a contact list on a computing device, devices a user has added to the accepted device list, devices connected with previously, devices in a same carrier plan, or any combination thereof. The accepted device list may include, for example, a contact list on a mobile phone, a contact list on another computing device, a contact list on a social media platform, devices a user has added to the accepted device list, devices connected with previously, devices in a same mobile carrier plan, devices currently or previously used by the same user, devices on a same mobile network, or any combination thereof. A contact list included in an accepted device list may be complete or incomplete. For example, a user may decline to include all contacts in a contact list in the accepted device list. In another example, only contacts in the contact list previously contacted may be included in the accepted device list. In an embodiment, accepted devices may be devices connected to previously. In another example, the network extension program 132 may compile the accepted device list by retrieving recent contacts, such as, for example, determining social media users in contact with a user of the first device 104 within a previous time period (e.g. one year) by communicating with a relevant social media server. In an embodiment, an accepted device may pick up any cost incurred in the piggybacking or a payment agreement may be arranged with the user of the accepted device. Accepted devices may give confidence to both an end device (e.g. the first device 104) and the intermediate (e.g. the second device 108), thus increasing the likelihood of a connection. An attempt of connection through an accepted device may have a low probability of rejection. Accepted devices may include devices which have bridged a call earlier for the first device 104. The accepted device list may be stored on a computer readable storage medium such as, for example, on the first device 104.

The network extension program 132 determines whether the network connection status of the first device 104 is weak connection or disconnected (decision 408). In an embodiment, the first device 104 may be determining the quality of a connection with the network 102 (FIG. 1) obtained by communicating with the second device 108. The network extension program 132 may analyze the quality of the network connection by performing, for example, a signal strength test, a network speed test, or any combination thereof. The connection status may be assigned based on a determination of the quality of the network connection. In an embodiment, the connection status may be based on a quality of a connection with the network 102 (FIG. 1). For example, a quality of a connection between the first device 104 and the network 102 (FIG. 1) via the second device may be analyzed. The connection status may include, for example, connected, strong connection, moderate connection, weak connection, disconnected, or any combination thereof. The connection status of connected may be assigned when a network connection may be connected which may range from a very strong to a very weak connection, and ranges therebetween. In an embodiment, the connection status of weak connection may be assigned when a network connection may be slow, nearly unusable, or unusable. In another embodiment, the connection status of weak connection may be assigned when a connection may be deteriorating. For example, a connection may be deteriorating when a rate of data flow drops at a defined rate or below a defined threshold. If a status of weak connection or disconnected is determined, the network extension program 132 may search for a second device (decision 408, Yes). For example, when a connection may be deteriorating, step 424 (discussed below) may be initiated and establish a second connection before disconnection occurs to increase likelihood of uninterrupted communication. By preemptively connecting to another device (e.g. a third device) before a connection is lost, the first device 104 may be able to maintain a communication without interruption. In an embodiment, if a connection status of weak connection or disconnected is not determined, the network extension program 132 may not search for a second device (decision 408, No). In another embodiment, even if a connection status of weak connection or disconnection is not determined, the network extension program 132 may still search for a second device. Connecting to a second device even when a connection status of weak connection or disconnection is not determined may increase likelihood of uninterrupted communication, but may also needlessly consume device resources (e.g. energy and memory). In an embodiment, the network extension program 132 may disable a search for a second device when, for example, a user selects an option to turn off a search, the first device 104 is set to power saving mode, the first device 104 has a low energy supply, the first device 104 is low on memory, or any combination thereof.

The network extension program 132 searches for a second device (step 424). In an embodiment, step 424 may be performed when a connection status is disconnected. In another embodiment, step 424 may be performed when a connection status is weak connection. In another embodiment, step 424 may be discontinued when a connection status is connected. In another embodiment, step 424 may be discontinued when a connection status is strong connection. In another embodiment, step 424 may be discontinued when a connection status is moderate connection. Step 424 may vary depending on a technology used in the first device 104 (FIG. 1) and a technology used in the second device 108 (FIG. 1). Step 424 may, for example, involve transmitting a radio signal and receiving a radio signal reply. For example, the first device 104 may transmit a radio signal to the second device 108. The second device 108 may respond with a radio signal which may be received by the first device 104. In another example, if a Bluetooth device is used in the first device 104 and the second device 108, step 424 may involve the first device 104 dividing data into packets and broadcasting the packets on a designated Bluetooth channel(s) which may be received by the second device 108. If the second device 108 receives a communication from the first device 104, the second device 108 may divide data into packets and transmit the packets on a designated Bluetooth channel to the first device 104. The first device 104 may receive data from the second device 108 indicating that the second device 108 is available to connect with.

The network extension program 132 evaluates connectivity, which may involve analyzing connectivity information to determine one or more connectivity capabilities of the second device 108 (decision 428). Connectivity information may include, for example, data indicating an availability of one or more communication devices on the second device 108. In an embodiment, connectivity information may be obtained by requesting connectivity information and receiving a response, requesting information without a response, performing a connectivity test, or any combination thereof. Requesting information and receiving a response may indicate that the method of communication is compatible and provide additional communication and permission information. Requesting information without a response may indicate that the method of communication used is not compatible. For example, the first device 104 may have used a communication method which is not compatible with the second device 108. If the first device 104 has an additional communication capability, the first device 104 may attempt another information request to try to obtain a response. A connectivity test may be any software utility capable of reaching a second device 108, such as, for example, a ping. In an embodiment, connectivity information may be stored from prior communications with the second device 108. In another embodiment, connectivity information of the second device 108 may be stored and may be updated by evaluating connectivity.

The network extension program 132 may determine if a connection status between a first device and a network is weak connection or disconnected (decision 430). A connection between the first device 104 and second device 108 may be established, and then weaken or disconnect, resulting in weakening or disconnection with a network since the second device 108 may be acting as an intermediary. For example, the first device 104 may be moving away from the second device 108 causing a connection status to change from "strong connection" to "weak connection" or "disconnected". In the event that a connection status between the first device 104 and second device 108 and/or the first device and a network connected to through the second device 108 becomes weak connection or disconnected, step 424, discussed above, may be initiated. If a connection status between the first device 104 and the second device 108 is connected or strong connection, the first device 104 may communicate with the second device 108. In an embodiment, if a connection status is weak connection, the first device 104 may commence searching for an additional device and communicate with the second device 108. By searching for an additional device and communicating at the same time, the first device 104 may proactively establish one or more additional connections with one or more additional devices before becoming disconnected from the second device 108.

The network extension program 132 may communicate with at least one network via a second device (step 432). Step 432 may be accomplished by establishing a connection between the first device 104 and the second device 108. The connection between the first device 104 and the second device 108 may enable the transmission of data from the second device 108 to the first device 104. The connection between the first device 104 and the second device 108 may enable the transmission of data from the first device 104 to the second device 108. The second device 108 may be connected to at least one network. Data transmitted from the at least one network may pass through the second device 108 to the first device 104. Data transmitted from the first device 104 may pass through the second device 108 to the at least one network. In an embodiment, communicating with at least one network via the second device 108 may require permission from the second device 108. Permission to communicate may be obtained from, for example, a prior communication with the second device 108, a user input on the second device 108, a user input on the first device 104 (e.g. a password), automatically be granted to one or more devices on an accepted device list, or any combination thereof.

Figure 5:
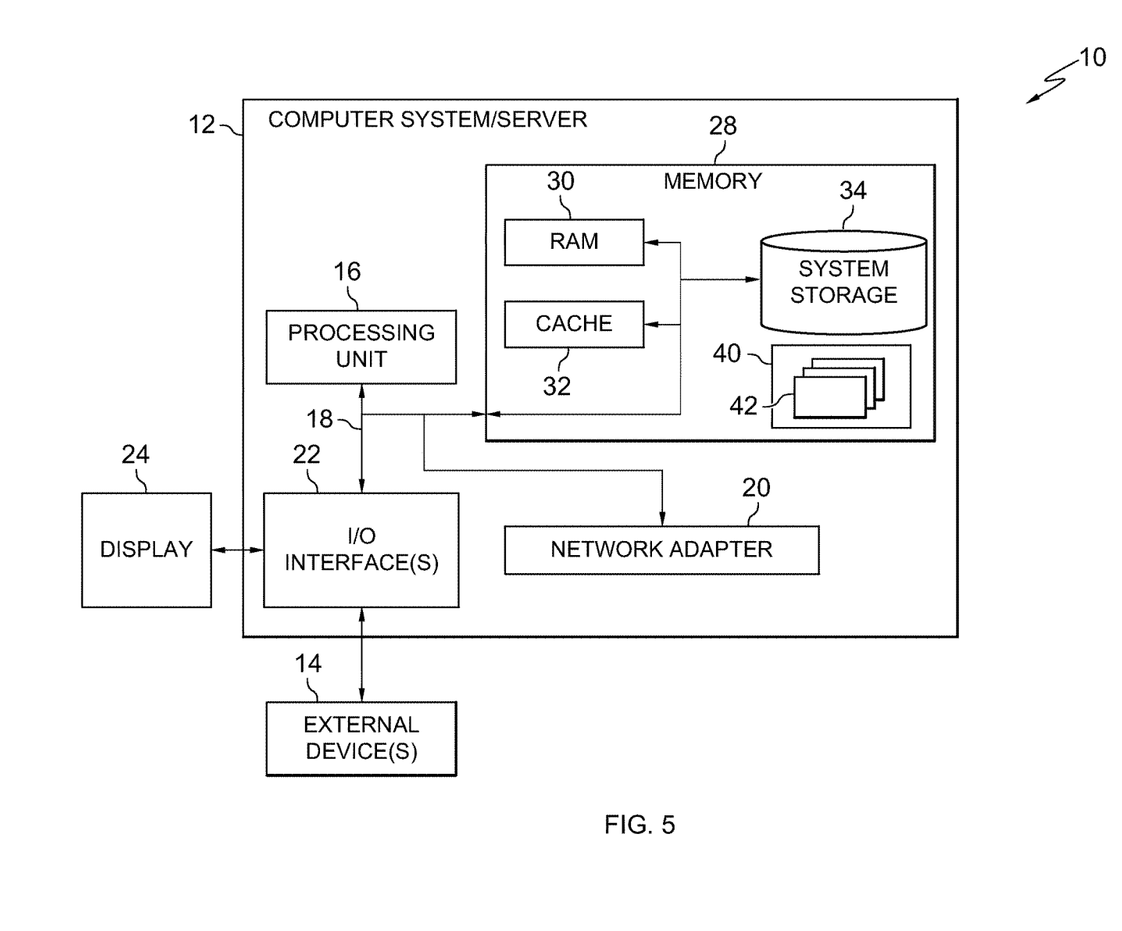
FIG. 5 depicts a block diagram of components of the proxy server computer executing the network extension program, in accordance with an embodiment of the present invention.

Referring now to FIG. 5, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for extending a mobile network for a first mobile device, the method comprising:
   determining a mobile network connection status of the first mobile device;
   in response to determining the mobile network connection status of the first mobile device with respect to a first mobile network is connected, but is below a threshold connectivity strength, searching for a second mobile device from an accepted device list;

determining a mobile network connection status of the second mobile device with respect to the first mobile network or, a second mobile network, or both;

connecting, via the second mobile device, to at least one mobile network of the second mobile device for a duration of time; and maintaining the connection between the first mobile device and the first mobile network in parallel with connecting to the at least one mobile network of the second mobile device.

2. The method of claim 1, wherein the first and second mobile networks are the same mobile network.

3. The method of claim 1, wherein connectivity strength corresponds to one of connected, disconnected, or weak.

4. The method of claim 1, wherein the accepted device list includes a contact list.

5. A computer program product for extending a mobile network for a first mobile device, the computer program product comprising a computer readable storage medium having program instructions embodied therewith, wherein the computer readable storage medium is not a transitory signal per se, the program instructions executable by a computer to cause the computer to perform a method comprising:

determining, by a computer, a mobile network connection status of the first mobile device;

in response to determining, by a computer, the mobile network connection status of the first mobile device with respect to a first mobile network is connected, but is below a threshold connectivity strength, searching for a second mobile device from an accepted device list; and determining, by a computer, a mobile network connection status of the second mobile device with respect to the first mobile network or, a second mobile network, or both;

connecting, by a computer, via the second mobile device, to at least one mobile network of the second mobile device for a duration of time; and maintaining, by a computer, the connection between the first mobile device and the first mobile network in parallel with connecting to the at least one mobile network of the second mobile device.

6. The computer program product of claim 5, wherein the first and second mobile networks are the same mobile network.

7. The computer program product of claim 5, wherein connectivity strength corresponds to one of connected, disconnected, or weak.

8. The computer program product of claim 5, wherein the accepted device list includes a contact list.

9. A computer system for extending a mobile network for a first mobile device, the computer system comprising:

one or more computer processors;

one or more computer-readable storage media;

program instructions stored on the computer-readable storage media for execution by at least one of the one or more processors comprising:

program instructions to determine a mobile network connection status of the first mobile device;

program instructions to search for a second mobile device from an accepted device list, in response to determining the mobile network connection status with respect to a first mobile network is connected, but is below a threshold connectivity strength;

determining a mobile network connection status of the second mobile device with respect to the first mobile network or, a second mobile network, or both;

program instructions to connect, via the second mobile device, to at least one mobile network of the second mobile device for a duration of time; and program instructions to maintain the connection between the first mobile device and the first mobile network in parallel with connecting to the at least one mobile network of the second mobile device.

10. The system of claim 9, wherein the first and second mobile networks are the same mobile network.

11. The system of claim 9, wherein connectivity strength corresponds to one of connected, disconnected, or weak.

* * * * *